(12) United States Patent
Utsumi et al.

(10) Patent No.: US 6,220,626 B1
(45) Date of Patent: Apr. 24, 2001

(54) AIR BELT APPARATUS

(75) Inventors: Hidetoshi Utsumi; Hidetsugu Okazaki; Hiroshi Akaba, all of Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/266,814

(22) Filed: Mar. 12, 1999

(30) Foreign Application Priority Data

Mar. 13, 1998 (JP) .................................................. 10-062861
Mar. 13, 1998 (JP) .................................................. 10-062863

(51) Int. Cl.$^7$ ..................................................... B60R 21/18
(52) U.S. Cl. ........................ 280/733; 280/739; 280/743.1
(58) Field of Search ................................. 280/733, 743.1, 280/739

(56) References Cited

U.S. PATENT DOCUMENTS 3,801,156 * 4/1974 Granig .
5,108,152 * 4/1992 Reilly et al. .
5,871,236 * 2/1999 Bauer et al. .

FOREIGN PATENT DOCUMENTS

2269791 * 2/1994 (GB) .

6-56001 3/1994 (JP) .

* cited by examiner

*Primary Examiner*—Eric Culbreth
(74) *Attorney, Agent, or Firm*—Armstrong, Westerman, Hattori, McLeland & Naughton (57) ABSTRACT

A portion of a shoulder belt 6 of an air belt apparatus touching the breast portion of an occupant is composed of an inflatable rubber bag 12 shaped like a tube, a webbing 13 for covering the outside of the bag 12 so that tension is produced in case of a car collision, and a pad 28 for further covering the outside of the webbing 13. The pad 28 has a three-layer structure: the outermost layer is made from raised cloth 29 such as moquette, or the like, which feels pleasant to the touch; the intermediate layer is made from an urethane sheet 30 having elasticity; and the innermost layer is made from base cloth 31 for protecting the urethane sheet 30. The pad 28 has rifts $28_1$ extending longitudinally. The pad 28 and an elastic element 32 made of a belt-like rubber sheet are sewed together with stitches 33 so that the rifts $28_1$ and $28_1$ are connected to each other. When the bag 12 is inflated in case of a car collision, the webbing 13 is inflated by the pressure of the bag 12. Further, the elastic element 32 is stretched and the pad 28 is inflated. As a result, the shoulder belt 6 is inflated as a whole. Accordingly, it is possible to improve the feeling given by a belt of an air belt apparatus.

3 Claims, 9 Drawing Sheets

AIR BELT APPARATUS

BACKGROUND OF THE INVENTION

The present invention relates to an air belt apparatus in which a belt for constraining an occupant to a seat is inflated with a gas supplied from an inflator in case of a car collision.

An air belt apparatus in which a bag is accommodated in the inside of a seat belt so that the bag is inflated in case of a car collision to constrain an occupant softly, is already known, for example, by a Japanese Patent Unexamined Publication No. Hei. 6-56001.

The belt of the aforementioned air belt apparatus has a webbing on its outside, and a bag in its inside. The webbing has a warp-knitting mesh structure so that the webbing follows the inflation of the bag to increase the diameter of the webbing and, at the same time, contract the webbing of the same. Accordingly, a surface of the webbing is so large-meshed as to be felt rough. The feeling obtained when an upper portion of a shoulder belt touches the nape of the occupant's neck directly without interposition of any clothes is not always pleasant.

On the other hand, a vent hole is provided in a bag of such an aforementioned air belt apparatus in such a manner that an excess of gas is discharged through the vent hole after the bag is inflated to thereby adjust the inner pressure of the bag to an appropriate value.

However, if the vent hole is blocked by the occupant's body when the occupant is constrained by the belt, there is a possibility that the gas is not discharged smoothly. There is a problem that it is difficult to discharge an excess of gas in appropriate timing to thereby adjust the inner pressure of the bag.

The present invention is designed on the aforementioned circumstances.

SUMMARY OF THE INVENTION

It is an object of the present invention to provided an improved air belt apparatus. Particularly, an object of a first aspect of the present invention is to improve the feeling given by a belt of an air belt apparatus. In addition to this, an object of a second aspect of the present invention is to provide an air bag apparatus having a vent hole with an excellent function for discharging an excess of gas from a bag of the air belt apparatus.

The first object can be achieved by an air belt apparatus for constraining an occupant to a seat, according to the present invention, comprising:

a webbing;

a bag accommodated in the webbing and inflated with a gas produced by an inflator in case of collision of a car on which the air belt apparatus is installed; and a protection material for covering a surface of the webbing.

According to the aforementioned configuration, in which the surface of the webbing of the air belt apparatus is coated with a protection material, the feeling given by the webbing touching the occupant becomes pleasant so that the occupant's unpleasant feeling given when the air belt apparatus is attached can be reduced.

Further, in the above-mentioned air belt apparatus according to the present invention, it is preferable that the protection material comprises:

a pad provided with rifts at both ends thereof, each of the rifts extending in a longitudinal direction of the protection material; and a belt-like elastic element connecting the rifts and extending in the longitudinal direction in such a manner that the belt-like elastic element allows the protection material to follow an inflation of the webbing on the basis of an expansion of the elastic element when the webbing is inflated together with the bag.

According to the aforementioned configuration, even in the case where the protection material is constituted by an inextensible material, the belt-like elastic element extending in the direction of length of the protection material is stretched so that the protection material can be inflated following the inflation of the bag and webbing.

The above-mentioned object can also be attained by an air belt apparatus for constraining an occupant to a seat, according to the present invention, comprising:

a belt including a webbing and a bag which is accommodated in the webbing and inflated with a gas produced by an inflator in case of a car collision;

a tongue member on which the belt is fixed; and a buckle member fixed on a car body and coupled with the tongue member, in which a vent holefor discharging the gas from the inside of the inflated bag is provided on at least one of the belt, the tongue member and the buckle member, and the vent hole is opened and disposed outside a range of interference with the occupant.

With the aforementioned configuration, when the inflator contents are ignited in case of a car collision, a gas produced is supplied to the bag disposed in the inside of the belt. As a result, the bag is inflated, so that the occupant can be constrained softly. When the inner pressure of the bag is increased on this occasion by an excess of gas supplied from the inflator to the bag or by a reaction force of the belt constraining the occupant, the gas in the bag is discharged through the vent hole. Because the vent hole is disposed in a position not facing the occupant, the gas is discharged smoothly so that the inner pressure of the bag can be adjusted to an appropriate value.

DETAILED DESCRIPTION OF THE PREFERRED EMBODIMENTS

A mode for carrying out the present invention will be described below on the basis of embodiments of the present invention shown in the accompanying drawings.

Figure 1:
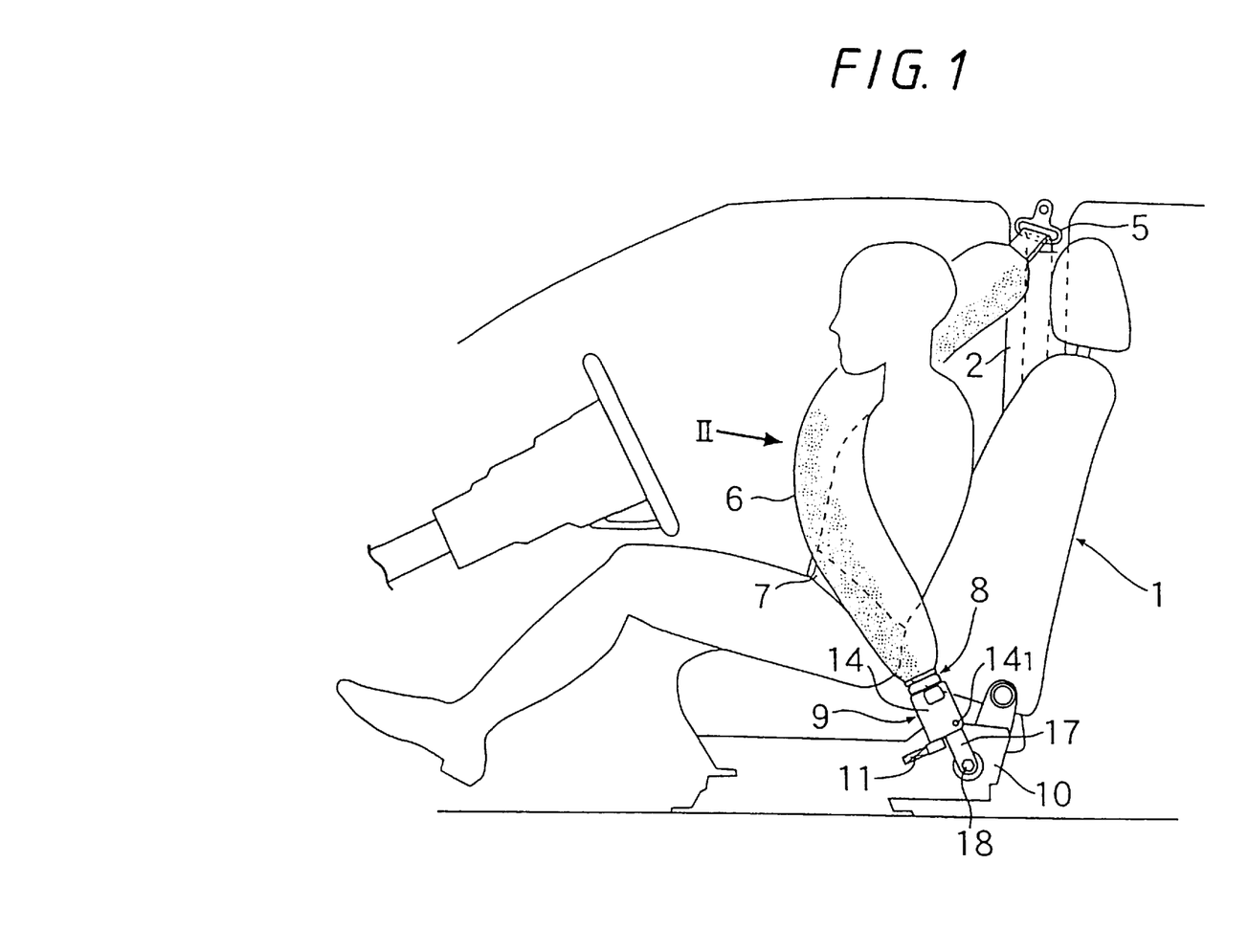
FIG. 1 is a side view of a front seat portion of a vehicle employing the invention.
Figure 2:
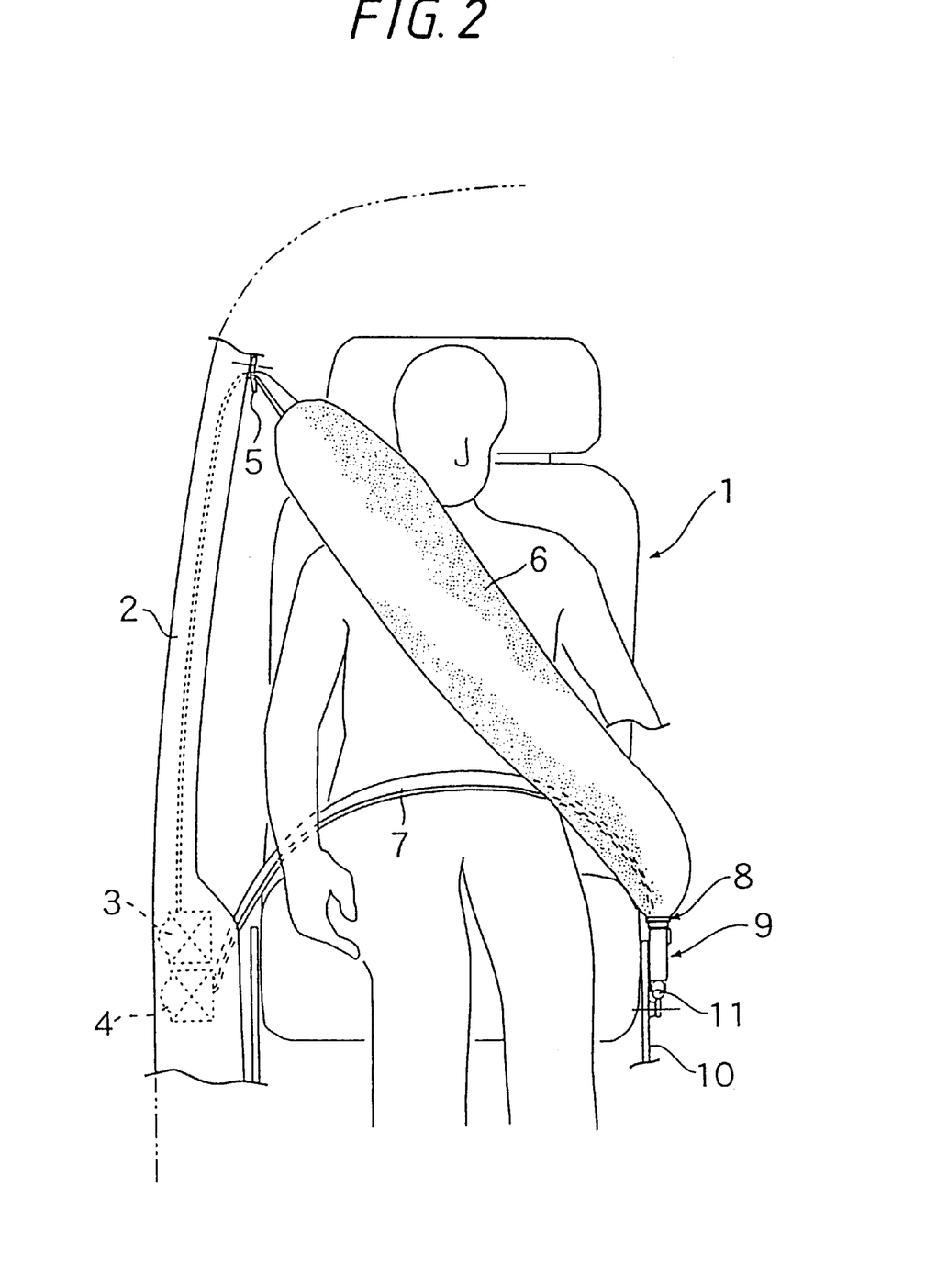
FIG. 2 is a view from the direction of the arrow II in FIG. 1.
Figure 3:
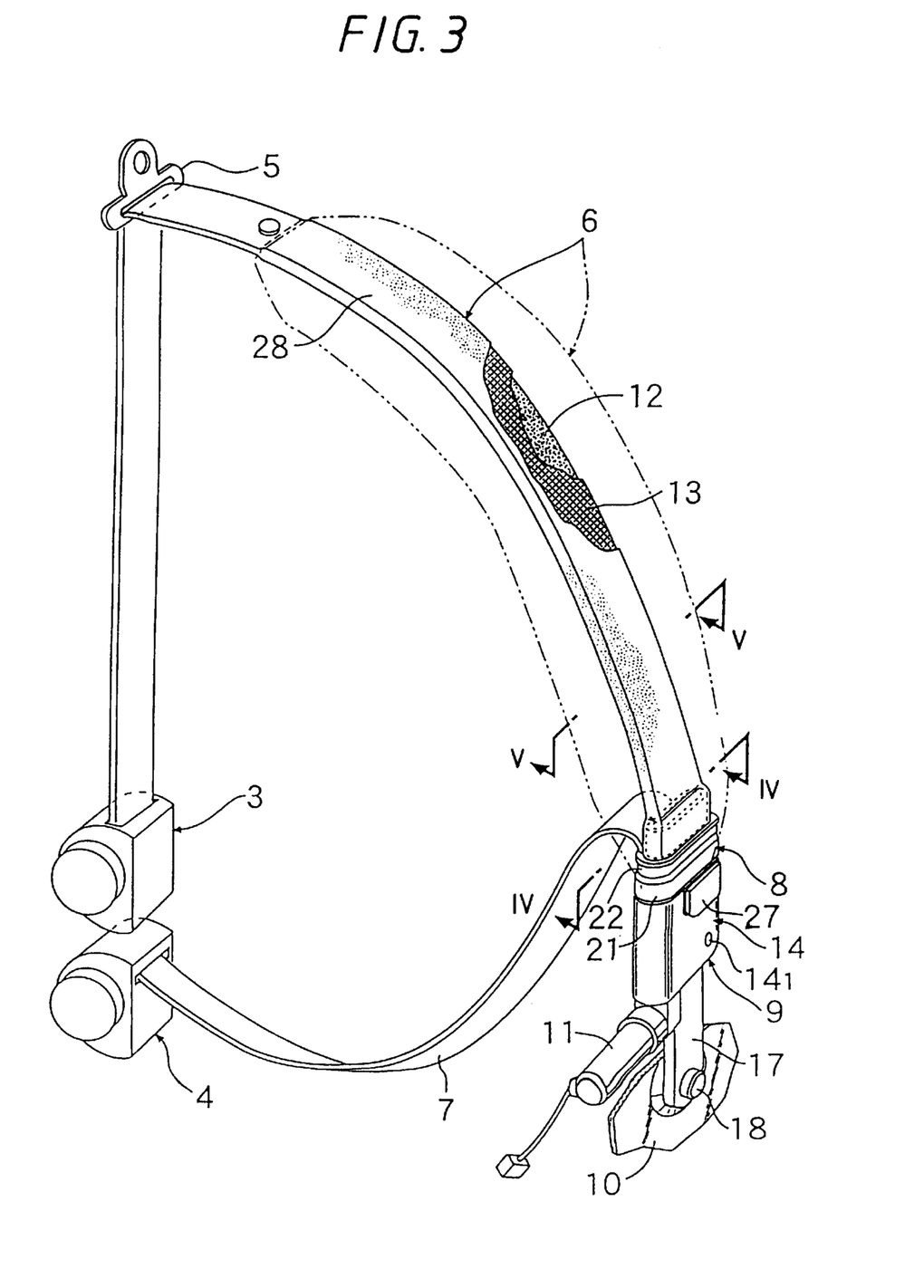
FIG. 3 is a perspective view partly in section of an air belt apparatus according to a first embodiment of the present invention.
Figure 4:
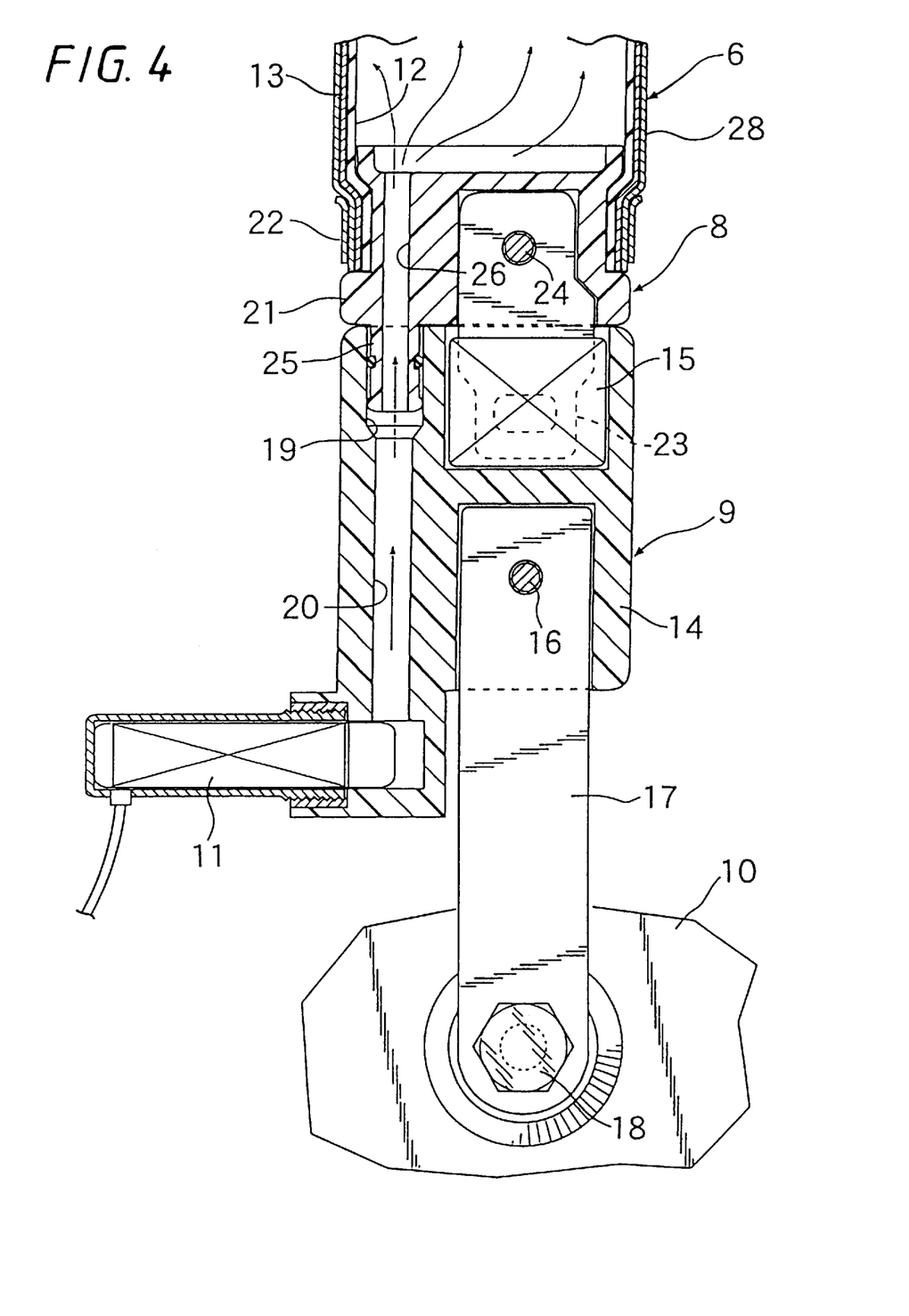
FIG. 4 is an enlarged sectional view taken along the line IV—IV in FIG. 3.
Figures 5, 5A:
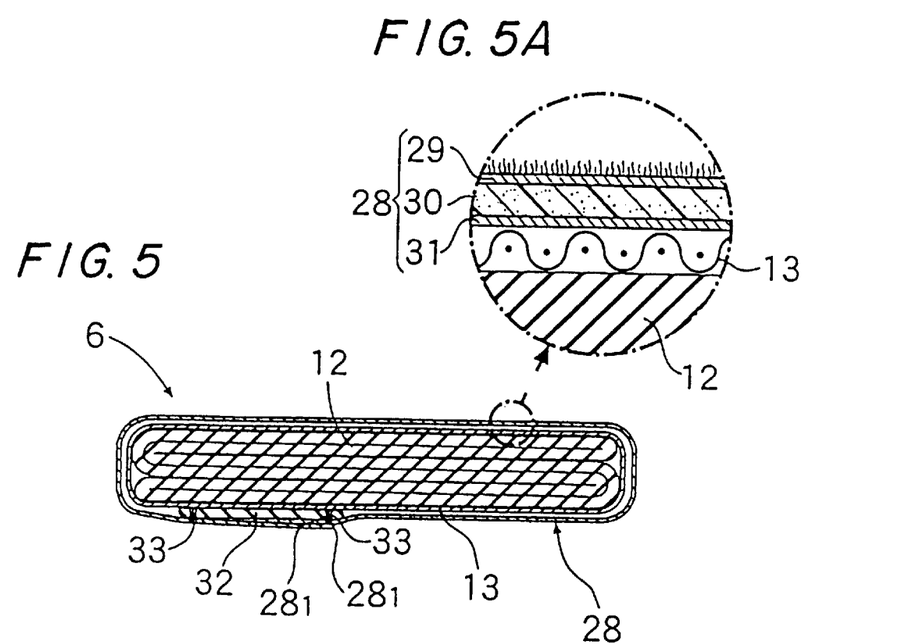
FIG. 5 is a sectional view taken along the line V—V in FIG. 3
FIG. 5A is an enlargement of a portion of FIG. 5.
Figure 6:
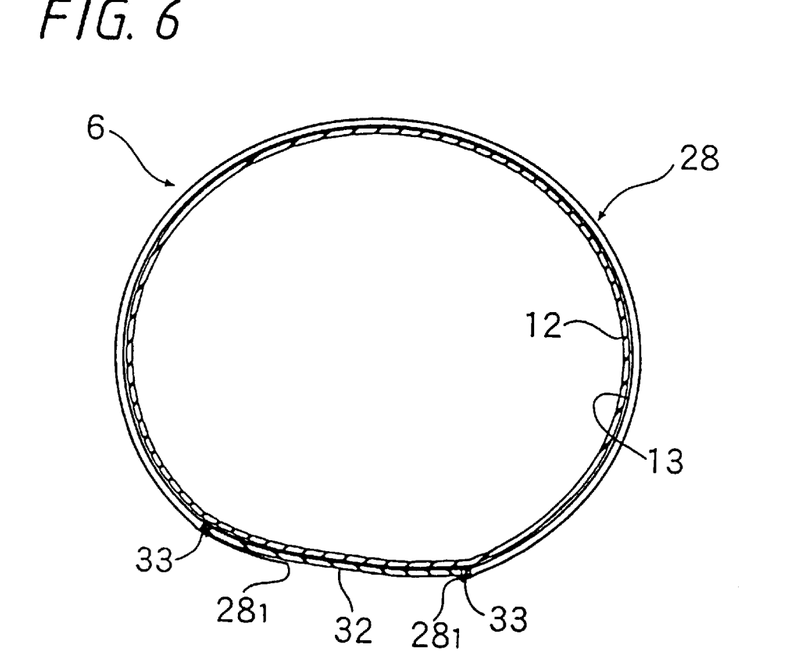
FIG. 6 is a cross-sectional view of an inflated shoulder belt.

FIGS. 1 to 6 show a first embodiment of the present invention. FIG. 1 is a side view of a front seat portion of a vehicle incorporating the invention; FIG. 2 is a view from the direction of the arrow II in FIG. 1; FIG. 3 is a perspective view of an air belt apparatus; FIG. 4 is an enlarged sectional view partly in section, taken along the line IV—IV in FIG. 3; FIG. 5 is an enlarged sectional view taken along the line V—V in FIG. 3; FIG. 5A is an enlargement of the indicated portion of FIG. 5; and FIG. 6 is a cross-sectional view of an inflated shoulder belt.

As shown in FIGS. 1 to 3, the air belt apparatus for constraining an occupant (a driver in this embodiment) to a front right seat 1 comprises: a shoulder belt retractor 3 provided in a lower portion of a center pillar 2; a lap belt retractor 4 provided under the shoulder belt retractor 3; a shoulder belt 6 drawn out from the shoulder belt retractor 3 and extended through a slip guide 5 provided in an upper portion of the center pillar 2; a lap belt 7 drawn out from the lap belt retractor 4; a tongue device 8 fixed to an end portion of the shoulder belt 6 and the lap belt 7; a buckle device 9 which is fixed to a seat base 10 made of a seat frame or a slide rail and to which the tongue device 8 is to be coupled; and an inflator 11 provided integrally with the buckle device 9.

The shoulder belt retractor 3 and the lap belt retractor 4, which are known, are provided for winding-up the shoulder belt 6 and the lap belt 7 respectively, so that the shoulder belt 6 and the lap belt 7 can be drawn out. In a normal case where an acceleration sensor (not shown) does not detect acceleration greater than, or equal to, a predetermined value, the two belts 6 and 7 are enabled to be drawn out so that the occupant's body is allowed to move. In the case where the aforementioned acceleration sensor detects acceleration greater than, or equal to, the predetermined value in case of a car collision, the two belts 6 and 7 are locked so as to be disabled from being drawn out to thereby constrain the occupant. The inflator 11, which is known, has its contents ignited when the acceleration sensor detects acceleration greater than, or equal to, the predetermined value, so that a high-pressure gas is produced by combustion of a propellant.

As shown in FIGS. 3 and 5, the lap belt 7 is constituted by a general plain weave belt of a synthetic resin. On the other hand, a portion of the shoulder belt 6, which touches the occupant's breast, is composed of an inflatable rubber bag 12 shaped like a tube, a webbing 13 for covering the outside of the bag 12 so that tension is produced in case of a car collision, and a pad 28 for further covering the outside of the webbing 13. The pad 28 constitutes the protection material in the present invention. In the normal case, the shoulder belt 6 is shaped like a flat belt. When a gas from the inflator 11 is supplied into the bag 12, the shoulder belt 6 is inflated as shown in FIGS. 1 and 2 to constrain the occupant softly. When the webbing 13 made from warp knitting is stretched radially in accordance with the inflation of the bag 12, the webbing 13 is shrunken longitudinally correspondingly to thereby produce initial tension in the shoulder belt 6.

The pad 28 has a three-layer structure. The outermost layer is made from raised cloth 29 such as moquette, or the like, which feels pleasant to the touch. The intermediate layer is made from an urethane sheet 30 having elasticity. The innermost layer is made from base cloth 31 for protecting the urethane sheet 30. The pad 28 has rifts $28_1$ and $28_1$ extending longitudinally. The pad 28 and an elastic element 32 made of a belt-like rubber sheet are sewed together with stitches 33 and 33 so that the rifts $28_1$ and $28_1$ are connected to each other. The elastic element 32 is normally covered with the pad 28 so that the lowering of external appearance of the shoulder belt 6 due to exposure of the elastic element 32 is prevented.

As clearly shown in FIG. 4, a buckle housing 14 constituting a body portion of the buckle device 9 is designed so that the inflator 11 is fixed to the lower portion of the buckle housing 14 and a buckle 15 is fixed to the upper portion of the buckle housing 14. A lower end of an anchor member 17 having an upper end fixed to the buckle housing 14 by a bolt 16 is supported through a fulcrum pin 18 to the seat base 10 so as to be able to swing back and forth. A connection port 19 opened in the upper wall of the buckle housing 14 and the inflator 11 are communicated with each other by a gas passage 20 formed in the inside of the buckle housing 14.

The bag 12 and webbing 13 in the shoulder belt 6 fitted to the upper outer circumferential surface of a tongue housing 21 of the tongue device 8 and the lap belt 7 piled on the outside of the shoulder belt 6 are fastened and fixed to each other by an annular holder 22. A tongue 23 having an upper half portion embedded in the inside of the tongue housing 21 is fixed to the tongue housing 21 by a bolt 24 which pierces the holder 22, the lap belt 7, the webbing 13 and the bag 12. A connection tube 25 capable of being inserted in the connection port 19 of the buckle housing 14 is provided so as to be protruded from the lower surface of the tongue housing 21. A gas passage 26 for communicating the connection port 19 with the inside of the bag 12 is formed in the inside of the tongue housing 21 and the connection tube 25. A release button 27 (see FIG. 3) for separating the tongue 23 connected to the buckle 15 is provided in the buckle housing 14.

The operation of the first embodiment of the present invention having the aforementioned configuration will be described below.

When the tongue 23 of the tongue device 8 is connected to the buckle 15 of the buckle device 9 to complete the attachment of the air belt apparatus as shown in FIG. 4, the connection tube 25 of the tongue device 8 is inserted in the connection port 19 of the buckle device 9.

When the acceleration sensor detects acceleration greater than, or equal to, a predetermined value in case of a car collision, the inflator 11 has its contents ignited so that a high-pressure gas is produced. The produced gas is supplied into the bag 12 of the shoulder belt 6 via the gas passage 20 of the buckle housing 14 and the gas passage 26 of the tongue housing 21, so that the bag 12 is inflated. When the bag 12 is inflated as shown in FIG. 6, the webbing 13 is inflated by the pressure of the bag 12. Further, the elastic element 32 is stretched and the pad 28 is inflated. As a result, the shoulder belt 6 is inflated as a whole. When the shoulder belt 6 is inflated as described above, the occupant can be constrained more softly because the contact area of the shoulder belt 6 with respect to the breast portion of the occupant is increased compared with the shoulder belt 6 which has been not inflated yet.

The shoulder belt 6 touches the breast portion which is in a range of from the nape of the neck to the side of the abdomen on the occupant's body. The shoulder belt 6, however, has a pleasant feeling because the surface of the shoulder belt 6 is covered with the soft pad 28. Accordingly, the unpleasant feeling given to the occupant by the attachment of the air belt apparatus is reduced so that contribution to the improvement of the ratio of attachment of the air belt apparatus can be made. Even in the case where the shoulder belt 6, inflated in case of a car collision, comes into intensively close contact with the occupant's body, the occupant can be constrained softly because of the presence of the pad 28. The position of the elastic element 32 of the pad 28 is preset so that the raised cloth 29 of the pad 28 accurately touches the nape of the occupant's neck which is not covered with any cloth in this occasion. That is, the elastic element 32 which is stretched so as to be exposed between the rifts $28_1$ and $28_1$ of the pad 28 when the shoulder belt 6 is inflated, is designed to be located in the side opposite to the occupant's body (see FIG. 2).

Although the embodiment of the present invention has been described above in detail, various changes in design may be made without departing from the gist of the present invention.

Although the first embodiment has been described above upon the case where the elastic element 32 is provided in the pad 28 so that the pad 28 can be inflated following the inflation of the bag 12, for example, the elastic element 32 may be omitted so long as the pad 28, per se, is formed of an extensible material.

A second embodiment of the present invention will be described below in the accompanying drawings. Note that a detailed explanation as to elements of the second embodiment which are substantially the same as the first embodiment in construction or function is eliminated by using same reference numerals in drawings.

Figure 7:
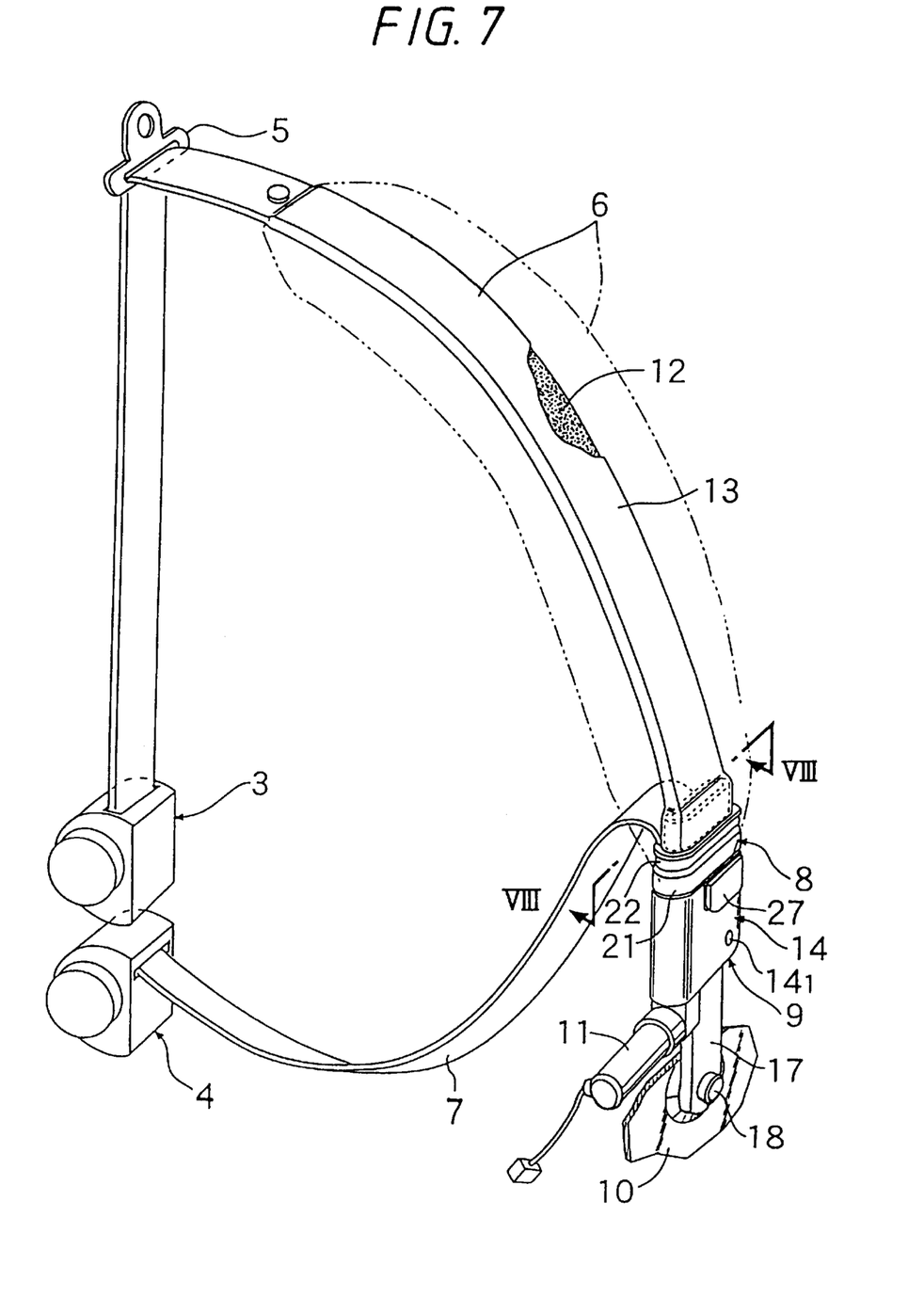
FIG. 7 is a perspective view of an air belt apparatus according to a second embodiment of the present invention.
Figure 8:
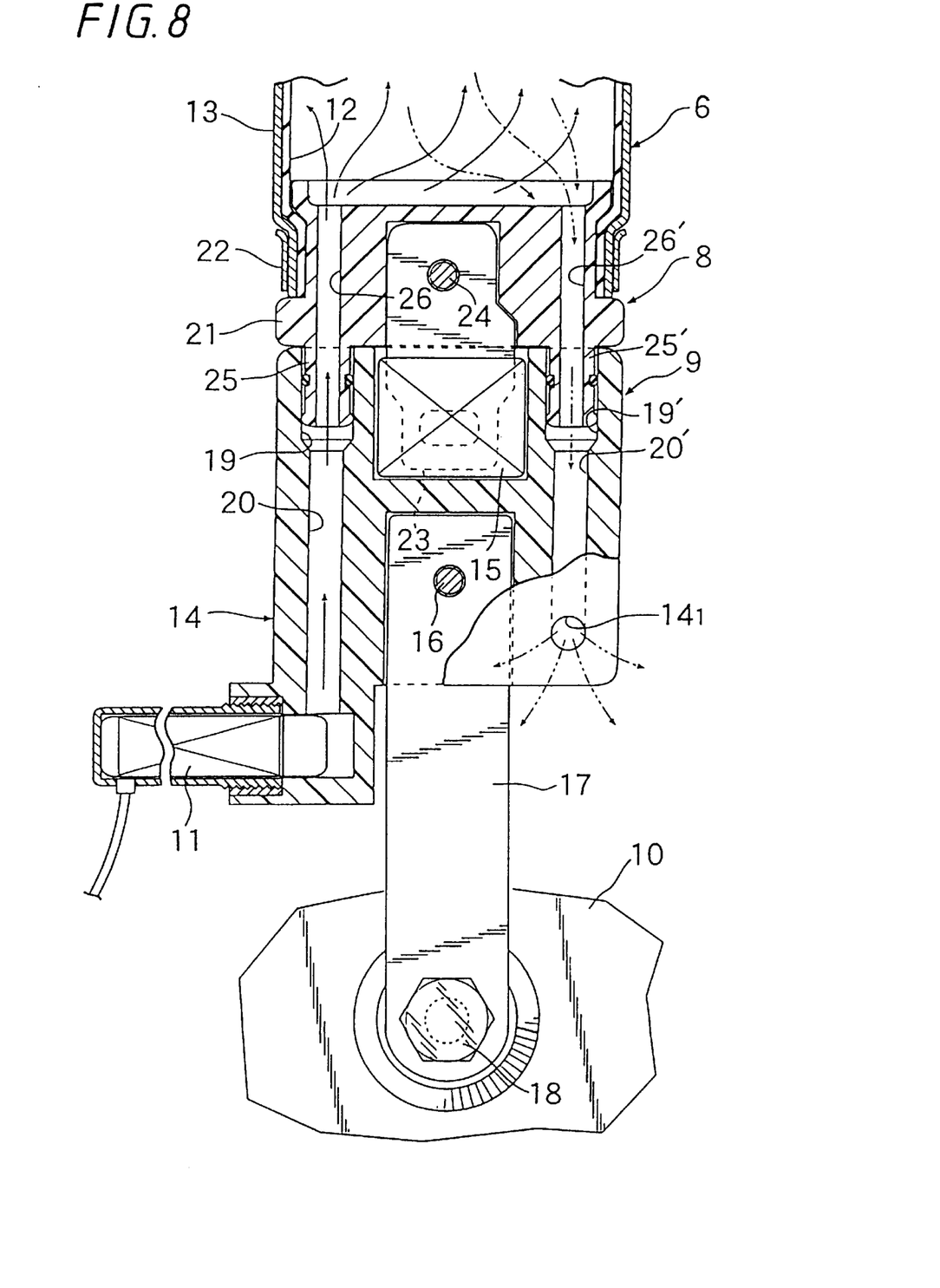
FIG. 8 is an enlarged sectional view taken along the line VIII—VIII in FIG. 7.

FIG. 7 is a perspective view of an air belt apparatus according to the second embodiment of the present invention, and FIG. 8 is an enlarged sectional view taken along the line VIII—VIII in FIG. 7.

FIGS. 7 and 8 show a second embodiment of the present invention. Although the shoulder belt 6 is covered with the pad 28 in the first embodiment, such a pad 28 is omitted in the second embodiment. On the other hand, it is possible to apply the pad 28 shown in the first embodiment into the shoulder belt of the second embodiment.

In the second embodiment, the bag 12 in the shoulder belt 6 has no vent hole for discharging an excess of gas, but a vent hole $14_1$ is provided in the buckle housing 14. That is, the tongue housing 21 has a gas-discharge connection tube 25' forming part of the vent system and a gas passage 26' which are located to be symmetrical to the gas-supply connection tube 25 and the gas passage 26, respectively. Further, the buckle housing 14 has a gas-discharge gas passage 20' located to be symmetrical to the gas-supply gas passage 20. The vent hole $14_1$ is formed at an end of the gas passage 20' so as to be opened in a side surface (a side surface which faces against the occupant sitting on the seat 1) of the buckle housing 14.

The operation of the second embodiment of the present invention having the aforementioned configuration will be described below.

When the tongue 23 of the tongue device 8 is connected to the buckle 15 of the buckle device 9 to complete the attachment of the air belt apparatus as shown in FIG. 4, the connection tubes 25 and 25' of the tongue device 8 are inserted in the connection ports 19 and 19' of the buckle device 9, respectively.

When the acceleration sensor detects acceleration greater than, or equal to, a predetermined value in case of a car collision, the inflator 11 is ignited to produce a high-pressure gas. The thus produced gas is supplied into the bag 12 of the shoulder belt 6 via the gas passage 20 of the buckle housing 14 and the gas passage 26 of the tongue housing 21 to inflate the bag 12. When the shoulder belt 6 is inflated in the aforementioned manner, the contact area of the shoulder belt 6 with respect to the breast portion of the occupant increases more greatly than that of the shoulder belt 6 before the inflation. Accordingly, the occupant can be constrained more softly.

If the production of the gas from the inflator 11 is further continued after completion of inflation of the bag 12 with the gas produced by the inflator 11 or if the inflated bag 12 is compressed by the pressure of the occupant moving ahead due to inertia in case of a car collision, the inner pressure of the bag 12 increases. Accordingly, the gas in the bag 12 is discharged from the vent hole $14_1$ via the gas passage 26' of the tongue housing 21 and the gas passage 20' of the buckle housing 14. As a result, the inner pressure of the bag 12 is kept to an appropriate value, so that the effect of absorbing shock is improved more greatly. Furthermore, because the vent hole $14_1$ is opened so as to face away from the occupant sitting on the seat 1, there is no risk of the blockage of the vent hole $14_1$ by the occupant's body. As a result, the gas is discharged so smoothly that the inner pressure of the bag 12 can be adjusted to an appropriate value.

Figure 9:
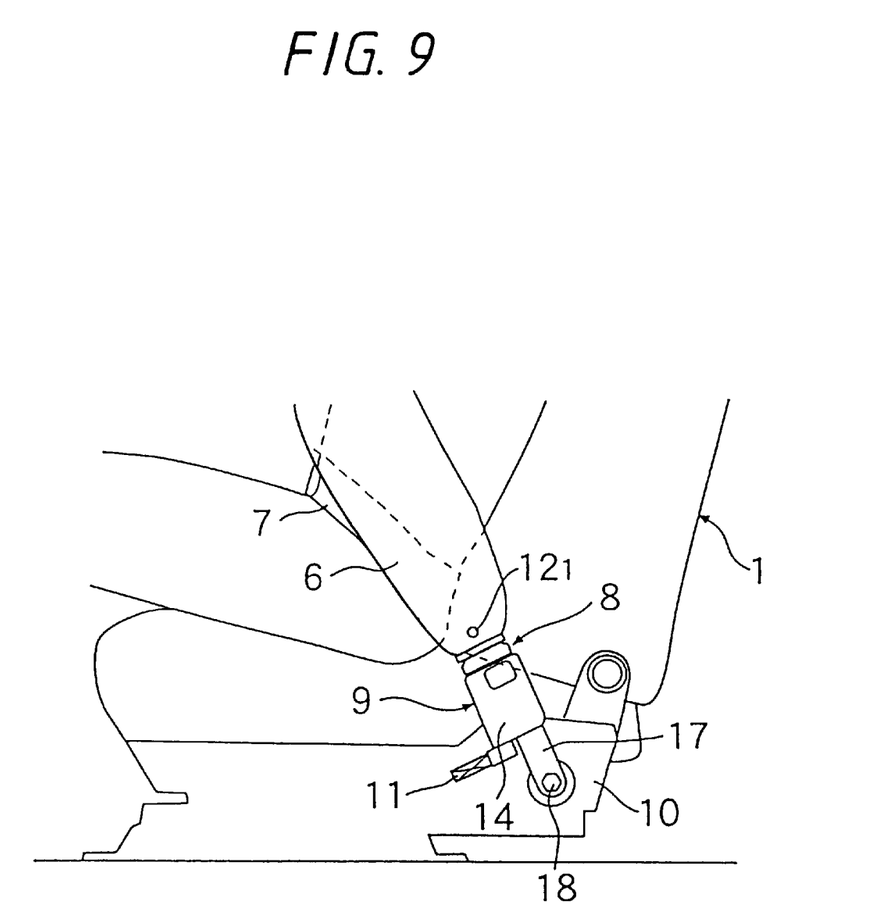
FIG. 9 is a view showing an inflated shoulder belt according to a third embodiment of the present invention.

A third embodiment of the present invention will be described below with reference to FIG. 9.

The third embodiment in which a vent hole $12_1$ is provided in the bag 12 of the shoulder belt 6, is characterized in the position of the vent hole $12_1$. That is, the vent hole $12_1$ is provided in the bag 12 in the vicinity of a lower end portion of the shoulder belt 6 connected to the tongue device 8. Further, the vent hole $12_1$ is opened to face away from the occupant sitting on the seat 1.

Note that although the shoulder belt 6 is covered with the pad 28 in the first embodiment, such a pad 28 is omitted in the third embodiment as well as the second embodiment. On the other hand, it is possible to apply the pad 28 shown in the first embodiment into the shoulder belt of the third embodiment.

According to the third embodiment, because the vent hole $12_1$ is opened so as to face away from the occupant, the vent hole $12_1$ is prevented from being blocked by the occupant's body so that the gas can be discharged smoothly. Further, because the vent hole $12_1$ is provided in the vicinity of the tongue device 8, the vent hole $12_1$ can be prevented from facing the occupant even in the case where the shoulder belt 6 is twisted.

Although the second and third embodiments of the present invention have been described above in detail, the present invention may be variously changed in design without departing from the gist of the present invention.

Figure 10:
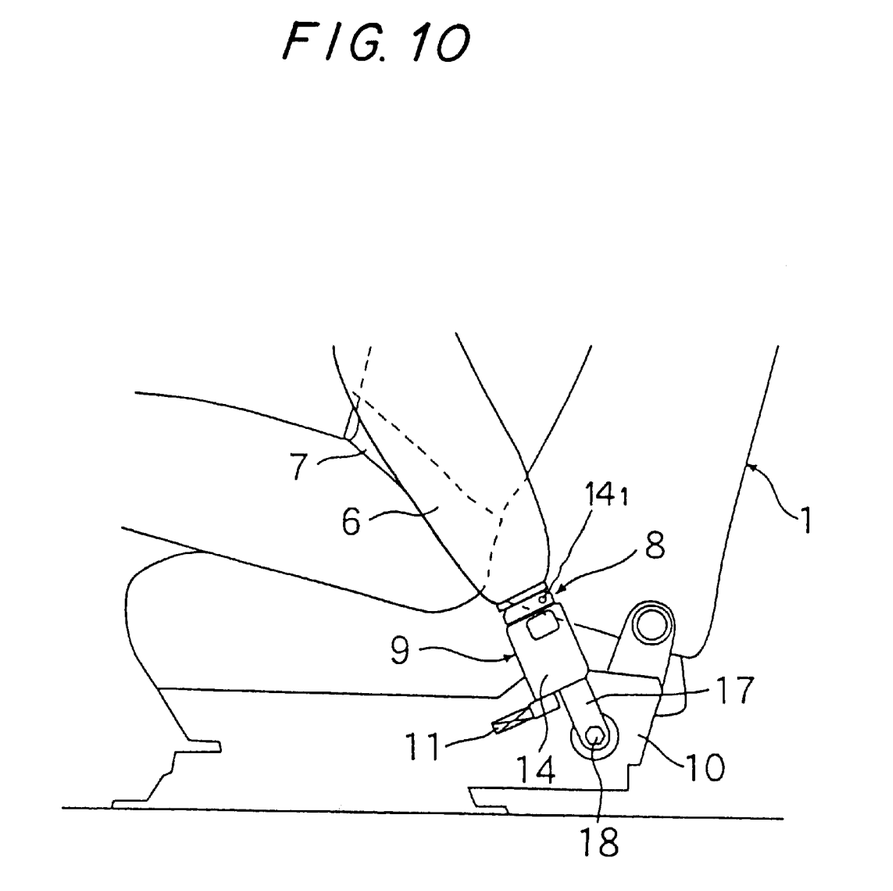
FIG. 10 is a view similar to FIG. 9 showing an inflated shoulder belt according to a fourth embodiment of the present invention.

Although the second embodiment has been described above upon the case where the vent hole $14_1$ is provided in the buckle housing 14, for example, the invention may, as schematically represented in FIG. 10, be applied also to the case where a vent hole $14_1$ is provided in the tongue housing 21 portion of the tongue device 8. In this case, both the connection tube 25' of the tongue housing 21 and the gas passage 20' of the buckle housing 14 become unnecessary, so that the configuration is simplified more greatly. Further, the vent hole 112, $14_1$ is not always required to be opened to face away from the occupant sitting on the seat 1 so long as the vent hole $12_1$, $14_1$ is disposed so as not to face the occupant.

As described above, according to the invention, because the surface of the webbing of the air belt apparatus is covered with a protection material, the feeling given by the webbing touching the occupant becomes pleasant so that the occupant's unpleasant feeling given when the air belt apparatus is attached can be reduced.

Further, according to the invention, even in the case where the protection material is constituted by an inextensible material, the belt-like elastic element extending in the direction of length of the protection material is stretched so that the protection material can be inflated following the inflation of the bag and webbing.

Moreover, according to the invention, when the inflator is activated in case of a car collision, a gas produced is supplied to the bag received in the inside of the belt. As a result, the bag is inflated, so that the occupant can be constrained softly. When the inner pressure of the bag is increased in this occasion by an excess of gas supplied from the inflator to the bag or by a reaction force of the belt constraining the occupant, the gas in the bag is discharged through the vent hole. Because the vent hole is disposed in a position not facing the occupant, the gas is discharged smoothly so that the inner pressure of the bag can be adjusted to an appropriate value.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. An air belt apparatus for constraining an occupant to a seat, comprising:

a webbing (13);

a bag (12) enclosed by said webbing (13) and inflated with a gas produced by an inflator (11) in case of collision of a car on which said air belt apparatus is installed; and a protection material covering a surface of said webbing (13), in which said protection material comprises:

a pad (28) provided with rifts ($28_1$) at opposite ends of said pad, each of said rifts extending in a longitudinal direction of said protection material; and an elastic element (32) connecting said rifts and extending in said longitudinal direction in such a manner that said elastic element allows said protection material (28) to follow an inflation of said webbing (13) on the basis of an expansion of said elastic element (32) when said webbing (13) is inflated together with said bag (12).

2. The air belt apparatus according to claim 1, in which said protection material comprises:

an outermost layer made from a raised cloth;

an intermediate layer made of an urethane sheet; and an innermost layer made of a base cloth.

3. An air belt apparatus for constraining an occupant to a seat, comprising:

a belt (6) including a webbing (13) and a bag (12) which is accommodated in said webbing (13) and inflated with a gas produced by an inflator (11) in case of a car collision;

a tongue member (8) on which said belt (6) is fixed; and a buckle member (9) fixed on a car body and coupled with said tongue member, in which a vent hole ($14_1$) for discharging said gas from the inside of said inflated bag (12) is formed on said buckle member (9), and said tongue member (8) is provided with gas discharging passage means (26') which communicate the inside of said inflated bag (12) with said vent hole and said vent hole is opened and disposed outside a range of interference with said occupant.

* * * * *